United States Patent
Qian et al.

(10) Patent No.: US 12,189,036 B2
(45) Date of Patent: Jan. 7, 2025

(54) MULTI-SENSOR CALIBRATION SYSTEM

(71) Applicant: TUSIMPLE, INC., San Diego, CA (US)

(72) Inventors: Chenzhe Qian, San Diego, CA (US); Ji Zhao, Beijing (CN); Zhibei Ma, San Diego, CA (US)

(73) Assignee: TUSIMPLE, INC., San Diego, CA (US)

(*) Notice: Subject to any disclaimer, the term of this patent is extended or adjusted under 35 U.S.C. 154(b) by 0 days.

(21) Appl. No.: 18/512,205

(22) Filed: Nov. 17, 2023

(65) Prior Publication Data

US 2024/0095960 A1 Mar. 21, 2024

Related U.S. Application Data

(63) Continuation of application No. 16/937,508, filed on Jul. 23, 2020, now Pat. No. 11,908,163.

(30) Foreign Application Priority Data

Jun. 28, 2020 (CN) .......................... 202010598425.2

(51) Int. Cl.
*G01S 17/89* (2020.01)
*G06T 3/14* (2024.01)
*G06T 7/521* (2017.01)
*G06T 7/80* (2017.01)
*G06V 10/24* (2022.01)
(Continued)

(52) U.S. Cl.
CPC ................ *G01S 17/89* (2013.01); *G06T 3/14* (2024.01); *G06T 7/521* (2017.01); *G06T 7/80* (2017.01); *G06V 10/24* (2022.01); *G06V 10/80* (2022.01); *G06V 20/588* (2022.01); *H04N 23/00* (2023.01); *G06T 2207/30204* (2013.01); *G06T 2207/30256* (2013.01); *G06V 10/62* (2022.01)

(58) Field of Classification Search
USPC ....................................................... 348/207.99
See application file for complete search history.

(56) References Cited

U.S. PATENT DOCUMENTS 7,840,352 B2 11/2010 Strelow et al.
9,063,548 B1* 6/2015 Ferguson ............. G05D 1/0231
(Continued)

FOREIGN PATENT DOCUMENTS

CN 112180362 A 1/2021
EP 3671643 A1 6/2020

OTHER PUBLICATIONS

Reinke et al., A Factor Graph Approach to Multi-Camera Extrinsic Calibration on Legged Robots, Published 2019 IEEE, pp. 391-394.
(Continued)

*Primary Examiner* — Paul D Lee
(74) *Attorney, Agent, or Firm* — Perkins Coie LLP

(57) ABSTRACT

Techniques for performing multi-sensor calibration on a vehicle are described. A method includes obtaining, from each of at least two sensors located on a vehicle, sensor data item of a road comprising a lane marker, extracting, from each sensor data item, a location information of the lane marker, and calculating extrinsic parameters of the at least two sensors based on determining a difference between the location information of the lane marker from each sensor data item and a previously stored location information of the lane marker.

20 Claims, 12 Drawing Sheets

(51) Int. Cl.
*G06V 10/80* (2022.01)
*G06V 20/56* (2022.01)
*H04N 23/00* (2023.01)
*G06V 10/62* (2022.01)

(56) References Cited

U.S. PATENT DOCUMENTS

| | | |
|---|---|---|
| 9,201,424 B1 | 12/2015 | Ogale |
| 9,563,951 B2 | 2/2017 | Okouneva |
| 10,298,910 B1 | 5/2019 | Kroeger |
| 10,724,865 B1 | 7/2020 | Ferguson et al. |
| 10,726,579 B1 | 7/2020 | Huang |
| 10,742,969 B1 | 8/2020 | Rohatgi et al. |
| 10,785,474 B1 | 9/2020 | Semansky |
| 11,048,277 B1 | 6/2021 | Zhu et al. |
| 11,829,139 B2 | 11/2023 | Jobanputra et al. |
| 2010/0164807 A1 | 7/2010 | Tseng et al. |
| 2010/0235129 A1 | 9/2010 | Sharma et al. |
| 2012/0320190 A1 | 12/2012 | Natroshvili et al. |
| 2013/0030811 A1 | 1/2013 | Olleon et al. |
| 2014/0139674 A1 | 5/2014 | Aoki et al. |
| 2014/0247354 A1 | 9/2014 | Knudsen |
| 2014/0294231 A1 | 10/2014 | Datta et al. |
| 2016/0275683 A1 | 9/2016 | Sakano et al. |
| 2017/0124781 A1* | 5/2017 | Douillard ............... G08G 1/207 |
| 2018/0158197 A1 | 6/2018 | Dasgupta et al. |
| 2018/0197310 A1 | 7/2018 | Singh et al. |
| 2018/0281698 A1 | 10/2018 | Tang et al. |
| 2018/0284243 A1 | 10/2018 | Wood |
| 2018/0292818 A1 | 10/2018 | Gariepy et al. |
| 2019/0012808 A1 | 1/2019 | Mou |
| 2019/0049566 A1 | 2/2019 | Adams et al. |
| 2019/0063945 A1 | 2/2019 | Liu et al. |
| 2019/0065863 A1 | 2/2019 | Luo et al. |
| 2019/0071094 A1 | 3/2019 | Nishiguchi et al. |
| 2019/0113608 A1 | 4/2019 | Mills |
| 2019/0204425 A1 | 7/2019 | Abari et al. |
| 2019/0204427 A1 | 7/2019 | Abari et al. |
| 2019/0248487 A1 | 8/2019 | Holtz et al. |
| 2019/0250601 A1 | 8/2019 | Donahoe et al. |
| 2019/0250640 A1 | 8/2019 | O'Flaherty et al. |
| 2019/0377345 A1 | 12/2019 | Bachrach et al. |
| 2019/0378423 A1 | 12/2019 | Bachrach et al. |
| 2020/0005489 A1 | 1/2020 | Kroeger |
| 2020/0018852 A1 | 1/2020 | Walls et al. |
| 2020/0073385 A1 | 3/2020 | Jobanputra et al. |
| 2020/0088858 A1 | 3/2020 | Li et al. |
| 2020/0089971 A1 | 3/2020 | Li et al. |
| 2020/0143710 A1* | 5/2020 | Zhou ............... G05D 1/0246 |
| 2020/0174107 A1 | 6/2020 | Briggs et al. |
| 2020/0218908 A1* | 7/2020 | Lee ............... G06V 10/82 |
| 2020/0226768 A1 | 7/2020 | Lombardi |
| 2020/0226790 A1 | 7/2020 | Alvarez et al. |
| 2020/0264625 A1 | 8/2020 | Estep et al. |
| 2020/0300637 A1 | 9/2020 | Chiu et al. |
| 2020/0334861 A1 | 10/2020 | Jin et al. |
| 2020/0349738 A1 | 11/2020 | Kamma |
| 2020/0410715 A1 | 12/2020 | Cadien et al. |
| 2021/0192788 A1 | 6/2021 | Diederichs et al. |
| 2021/0215505 A1 | 7/2021 | Castorena Martinez et al. |
| 2021/0383570 A1 | 12/2021 | Cai |
| 2021/0407130 A1 | 12/2021 | Qian et al. |
| 2022/0055652 A1* | 2/2022 | Lee ............... G01S 17/89 |
| 2022/0066002 A1 | 3/2022 | Abari |
| 2022/0108117 A1* | 4/2022 | Potnis ............... G01S 17/87 |
| 2022/0227380 A1 | 7/2022 | Griffith et al. |
| 2022/0299592 A1 | 9/2022 | Chiu et al. |
| 2023/0027622 A1 | 1/2023 | Haeusler |

OTHER PUBLICATIONS

US Patent & Trademark Office, Notice of Allowance for U.S. Appl. No. 16/953,089, mailed Dec. 12, 2023, 11 pages.

US Patent & Trademark Office, Non-Final Office Action for U.S. Appl. No. 16/953,089, mailed Aug. 31, 2023, 21 pages.

US Patent & Trademark Office, Non-Final Office Action for U.S. Appl. No. 16/937,508, mailed Jun. 23, 2023, 21 pages.

Walters, Celyn et al., "A Robust Extrinsic Calibration Framework for Vehicles with Unscaled Sensors," 2019 IEEE/RSJ International Conference on Intelligent Robots and Systems (IROS), pp. 36-42, Macau, China, Nov. 4-8, 2019.

US Patent & Trademark Office, Notice of Allowance for U.S. Appl. No. 16/937,508, mailed Oct. 13, 2023, 9 pages.

Dellaert, F. et al., "Factor Graphs for Robot Perception," Foundations and Trends® in Robotics, 6(1-2), pp. 1-139, 2017, available at https://www.cc.gatech.edu/~dellaert/pubs/Dellaert17fnt.pdf.

"Factor Graphs and GTSAM," GTSAM, available at https://gtsam.org/tutorials/intro.html, Oct. 2020.

Forster, C. et al., "IMU Preintegration on Manifold for Efficient Visual-Inertial Maximum-a-Posteriori Estimation," available at https://smartech.gatech.edu/bitstream/handle/1853/55417/IMU%20Preintegration%20on%20Manifold%20for%20Efficient.pdf?sequence=1&isAllowed=y, Jan. 2015.

Forster, C. et al., "On-Manifold Preintegration for Real-Time Visual-Inertial Odometry," IEEE Transactions on Robotics, 2016, available at https://arxiv.org/pdf/1512.02363.pdf.

Dong, J. et al., "Motion Planning as Probabilistic Inference using Gaussian Processes and Factor Graphs," Institute for Robotics & Intelligent Machines, Robotics: Science and Systems, vol. 12, available at https:// homes.cs.washington.edu/~bboots/files/GPMP2.pdf, Jun. 2016.

Mirzaei, F. et al., "A Kalman Filter-Based Algorithm for IMU-Camera Calibration: Observability Analysis and Performance Evaluation," IEEE Transactions on Robotics, 24(5), pp. 1143-1156, Oct. 2008.

Hartley, et al., "Epipolar Geometry and the Fundamental Matrix," Multiple View Geometry, Chapter 9, Apr. 2004.

US Patent & Trademark Office, Notice of Allowance for U.S. Appl. No. 17/150,271, mailed Mar. 7, 2023, 10 pages.

Jeong, Jingyong et al. Road is Enough! Extrinsic Calibration of Non-Overlapping Stereo Camera and LiDAR Using Road Information. arxiv.org, Cornell University Library, 201 Olin Library Cornell University Ithaca, NY 14853, Feb. 27, 2019 (Feb. 27, 2019), XP081121682.

Grubl, Alexander. European Application No. 21181384.5, Extended European Search Report Mailed Nov. 25, 2021, pp. 1-8.

US Patent & Trademark Office, Non-Final Office Action for U.S. Appl. No. 17/150,271, mailed Sep. 15, 2022, 18 pages.

Richard Hartley, An Investigation of the Essential Matrix, 2001 (Year: 2001).

Pedro Miraldo, On the Generalized Essential Matrix Correction: An Efficient Solution to the Problem and Its Applications, Jun. 6, 2020, Journal of Mathematical Imaging and Vision (Year: 2020).

US Patent & Trademark Office, Final Office Action for U.S. Appl. No. 17/150,271, mailed Dec. 22, 2022, 21 pages.

\* cited by examiner

MULTI-SENSOR CALIBRATION SYSTEM

CROSS-REFERENCE TO RELATED APPLICATIONS

This patent document is a continuation of U.S. patent application Ser. No. 16/937,508, filed on Jul. 23, 2020, which claims the benefit of and priority to Chinese Patent Application No. 202010598425.2, filed on Jun. 28, 2020. The aforementioned applications are incorporated herein by reference in their entireties.

TECHNICAL FIELD

This document describes techniques to perform multi-sensor calibration for sensors located in a vehicle with pre-defined and/or endurable markers.

BACKGROUND

A vehicle may include cameras attached to the vehicle for several purposes. For example, cameras may be attached to a roof of the vehicle for security purposes, for driving aid, or for facilitating autonomous driving. Cameras mounted on a vehicle can obtain images of one or more areas surrounding the vehicle. These images can be processed to obtain information about the road or about the objects surrounding the vehicle. For example, images obtained by a camera can be analyzed to determine distances of objects surrounding the autonomous vehicle so that the autonomous vehicle can be safely maneuvered around the objects.

SUMMARY

Exemplary multi-sensor calibration techniques to calibrate multiple sensors located on or in a vehicle are described. In an example embodiment, a method of autonomous vehicle operation includes obtaining, from each of at least two sensors located on a vehicle, sensor data item of a road comprising a lane marker, extracting, from each sensor data item, a location information of the lane marker, and calculating extrinsic parameters of the at least two sensors based on determining a difference between the location information of the lane marker from each sensor data item and a previously stored location information of the lane marker.

In some embodiments, the obtaining sensor data item from each of the at least two sensors and the extracting the location information of the lane marker from each sensor data item comprises receiving, from a camera located on the vehicle, an image comprising the lane marker; determining, from the image, pixel locations of corners of the lane marker; receiving, from a light detection and ranging (LiDAR) sensor located on the vehicle, a frame comprising point cloud data (PCD) of an area of the road that comprises the lane marker; and determining a set of three-dimensional (3D) world coordinates of the corners of the lane marker.

In some embodiments, the set of 3D world coordinates of the corners of the lane marker are determined by obtaining, based on a location of the vehicle, a second set of previously stored three-dimension (3D) world coordinates of the corners of the lane marker, where the previously stored location information of the lane marker comprises the second set of previously stored 3D world coordinates of the corners of lane marker; and projecting the second set of previously stored 3D world coordinates of the corners of the lane marker to a coordinate system of the LiDAR sensor to obtain the set of 3D world coordinates of the corners of the lane marker in the frame.

In some embodiments, the extrinsic parameters of the at least two sensors are calculated by calculating, for each corner of the lane marker, a first loss function that computes a distance between a pixel location of a corner of a lane marker and the previously stored 3D world coordinates of the corner of the lane marker obtained from the second set; calculating, for each corner of the lane marker, a second loss function that computes a distance between 3D world coordinates of the corner of the lane marker obtained from the set and the previously stored 3D world coordinates of the corner of the lane marker obtained from the second set; and estimating the extrinsic parameters for the camera and LiDAR sensor based on the first loss function and the second loss function, respectively.

In some embodiments, the second set of previously stored 3D world coordinates of the corners of the lane marker are projected to the coordinate system of the LiDAR sensor by obtaining a transformed point cloud by correlating the PCD received from the LiDAR sensor to one or more points of a point cloud map reference; extracting a submap from a previously obtained PCD map; performing a registration of the transformed point cloud to the submap to obtain a first transformation matrix that describes transformation between the transformed point cloud and the submap, where the registration correlates the transformed point cloud to the submap; determining additional transformation matrixes that describes transformation between a position of the LiDAR sensor, the one or more points of the point cloud map reference, and a reference point associated with an inertial measurement unit-global navigation satellite system (IMU-GNSS) sensor located in the vehicle; and calculating the set of 3D world coordinates of the corners of the lane marker in the frame based on the first transformation matrix, the additional transformation matrixes, and the second set of previously stored 3D world coordinates of the corners of the lane marker.

In some embodiments, the PCD is correlated to the point cloud map reference based on a measurement provided by the IMU-GNSS sensor and a previously stored LiDAR to IMU extrinsic parameters, and the previously stored LiDAR to IMU extrinsic parameters describe a spatial relationship between positions and orientations of the LiDAR and the IMU-GNSS sensor. In some embodiments, the submap comprises 3D world coordinates of points within a pre-determined distance of the location of the vehicle when the PCD is received.

An example embodiment discloses a system for calibration of multiple sensors on or in a vehicle, the system comprising a processor configured to obtain, from each of at least two sensors located on the vehicle, sensor data item of a road comprising a lane marker; extract, from each sensor data item, a location information of the lane marker; and calculate extrinsic parameters of the at least two sensors based on determining a difference between the location information of the lane marker from each sensor data item and a previously stored location information of the lane marker.

In some embodiments, the processor is configured to obtain sensor data item from each of the at least two sensors and to extract the location information of the lane marker from each sensor data item by being configured to: receive, from a camera located on the vehicle, an image comprising the lane marker; determine, from the image, locations of corners of the lane marker; receive, from a light detection and ranging (LiDAR) sensor located on the vehicle, a frame comprising point cloud data (PCD) of an area that comprises the lane marker; and determine a set of three-dimensional (3D) world coordinates of the corners of the lane marker, where the at least two sensors comprises the camera and the LiDAR sensor.

In some embodiments, the set of 3D world coordinates of the corners of the lane marker are determined by the processor configured to obtain, based on a location of the vehicle, a second set of previously stored three-dimension (3D) world coordinates of the corners of the lane marker, where the previously stored location information of the lane marker comprises the second set of previously stored 3D world coordinates of the corners of lane marker; and obtain the set of 3D world coordinates of the corners of the lane marker in the frame by using the second set of previously stored 3D world coordinates of the corners of the lane marker and a coordinate system of the LiDAR sensor. In some embodiments, the extrinsic parameters of the camera are calculated by the processor configured to calculate, for a corner of the lane marker, a loss function that computes a distance between a location of the corner of a lane marker and the previously stored 3D world coordinates of the corner of the lane marker obtained from the second set; and estimate the extrinsic parameters for the camera based on the loss function.

In some embodiments, the extrinsic parameters of the LiDAR sensor are calculated by the processor configured to calculate, for a corner of the lane marker, a loss function that computes a distance between 3D world coordinates of the corner of the lane marker obtained from the set and the previously stored 3D world coordinates of the corner of the lane marker obtained from the second set; and estimate the extrinsic parameters for the LiDAR sensor based on the loss function. In some embodiments, the second set of previously stored 3D world coordinates of the corners of the lane marker are used with the coordinate system of the LiDAR sensor by the processor configured to: obtain a transformed point cloud using the PCD received from the LiDAR sensor with one or more points of a point cloud map reference; perform a registration of the transformed point cloud to a submap to obtain a first transformation matrix that describes transformation between the transformed point cloud and the submap, where the submap is obtained from a previous PCD map; determine additional transformation matrixes that describes transformation between a position of the LiDAR sensor, the one or more points of the point cloud map reference, and a reference point associated with an inertial measurement unit-global navigation satellite system (IMU-GNSS) sensor located in the vehicle; and calculate the set of 3D world coordinates of the corners of the lane marker in the frame based on the first transformation matrix, the additional transformation matrixes, and the second set of previously stored 3D world coordinates of the corners of the lane marker. In some embodiments, the PCD is correlated to the point cloud map reference.

An example embodiment discloses a non-transitory computer readable storage medium having code stored thereon, the code, when executed by a processor, causing the processor to implement a method comprising obtaining, from each of at least two sensors located on a vehicle, sensor data item of a road comprising a lane marker; extracting, from each sensor data item, a location information of the lane marker; and calculating extrinsic parameters of the at least two sensors based on determining a difference between the location information of the lane marker from each sensor data item and a previously stored location information of the lane marker.

In some embodiments, the obtaining sensor data item from each of the at least two sensors and the extracting the location information of the lane marker from each sensor data item comprises: receiving, from a first sensor located on the vehicle, a first sensor data comprising the lane marker; determining, from the image, locations of corners of the lane marker; receiving, from a second sensor located on the vehicle, a second sensor data of an area of the road that comprises the lane marker; and determining a set of three-dimensional (3D) world coordinates of the corners of the lane marker.

In some embodiments, the set of 3D world coordinates of the corners of the lane marker are determined by: obtaining, based on a location of the vehicle, a second set of previously stored three-dimension (3D) world coordinates of the corners of the lane marker, where the previously stored location information of the lane marker comprises the second set of previously stored 3D world coordinates of the corners of lane marker; and projecting the second set of previously stored 3D world coordinates of the corners of the lane marker to a coordinate system of the second sensor to obtain the set of 3D world coordinates of the corners of the lane marker in the second sensor data. In some embodiments, the extrinsic parameters of the at least two sensors are calculated by calculating, for each of at least two corners of the lane marker, a first loss function that computes a distance between a location of a corner of a lane marker and the previously stored 3D world coordinates of the corner of the lane marker obtained from the second set; calculating, for each of at least two corners of the lane marker, a second loss function that computes a distance between 3D world coordinates of the corner of the lane marker obtained from the set and the previously stored 3D world coordinates of the corner of the lane marker obtained from the second set; and estimating the extrinsic parameters for the first sensor and the second sensor based on the first loss function and the second loss function, respectively.

In some embodiments, the second set of previously stored 3D world coordinates of the corners of the lane marker are projected to the coordinate system of the second sensor by: obtaining a transformed point cloud by correlating the second sensor data received from the second sensor to one or more points of a point cloud map reference; extracting a submap from a previously obtained map; obtaining, by correlating the transformed point cloud to the submap, a first transformation matrix that describes transformation between the transformed point cloud and the submap; determining additional transformation matrixes that describes transformation between a position of the second sensor, the one or more points of the point cloud map reference, and a reference point associated with an inertial measurement unit-global navigation satellite system (IMU-GNSS) sensor located in the vehicle; and calculating the set of 3D world coordinates of the corners of the lane marker in the second sensor data based on the first transformation matrix, the additional transformation matrixes, and the second set of previously stored 3D world coordinates of the corners of the lane marker. In some embodiments, the submap comprises 3D world coordinates of points within a pre-determined distance of the location of the vehicle when the second sensor data is received.

In another exemplary aspect, the above-described methods are embodied in the form of processor-executable code and stored in a non-transitory computer-readable storage medium. The non-transitory computer readable storage includes code that when executed by a processor, causes the processor to implement the methods described in the embodiments.

In yet another exemplary embodiment, a device that is configured or operable to perform the above-described methods is disclosed.

The above and other aspects and their implementations are described in greater detail in the drawings, the descriptions, and the claims.

DETAILED DESCRIPTION

An autonomous vehicle includes cameras and Light Detection and Ranging (LiDAR) sensors mounted on the autonomous vehicle to obtain sensor data items (e.g., an image from camera and point cloud map from LiDAR sensor) of one or more areas surrounding the autonomous vehicle. These sensor data items can be analyzed by a computer on-board the autonomous vehicle to obtain distance or other information about the road or about the objects surrounding the autonomous vehicle. However, the cameras and LiDAR sensors on the autonomous vehicle need to be calibrated so that the computer on-board the autonomous vehicle can precisely or accurately detect an object and determine its distance. In a related calibration system, a well-trained technician sets up a calibration board for data collection and runs the calibration upon the data. The overall process can be extremely time-consuming and not-easy to operate.

For autonomous driving, the autonomous vehicle sensors together should cover 360-degree field-of-view with redundancy to ensure the safety. There are multiple LiDARs and cameras mounted on the vehicle at different positions with specified orientation. Additionally, the related calibration techniques rely on an inertial measurement unit-global navigation satellite system (IMU-GNSS) sensor in the autonomous vehicle, where the IMU-GNSS sensor is aligned to the autonomous vehicle body frame by operating a precise, accurate and easy-to-operate calibration provided by the manufacturer. Since the IMU-GNSS performs at best during movement, an autonomous vehicle keeps moving through the process of the calibration. The calibration process estimates the relative translation and orientation of a specific sensor to a pre-defined reference coordinate located on the vehicle body or a reference sensor, for example, an IMU. In a related calibration system, a dedicated and well-trained team is required to perform such elaborative task.

Figure 1A:
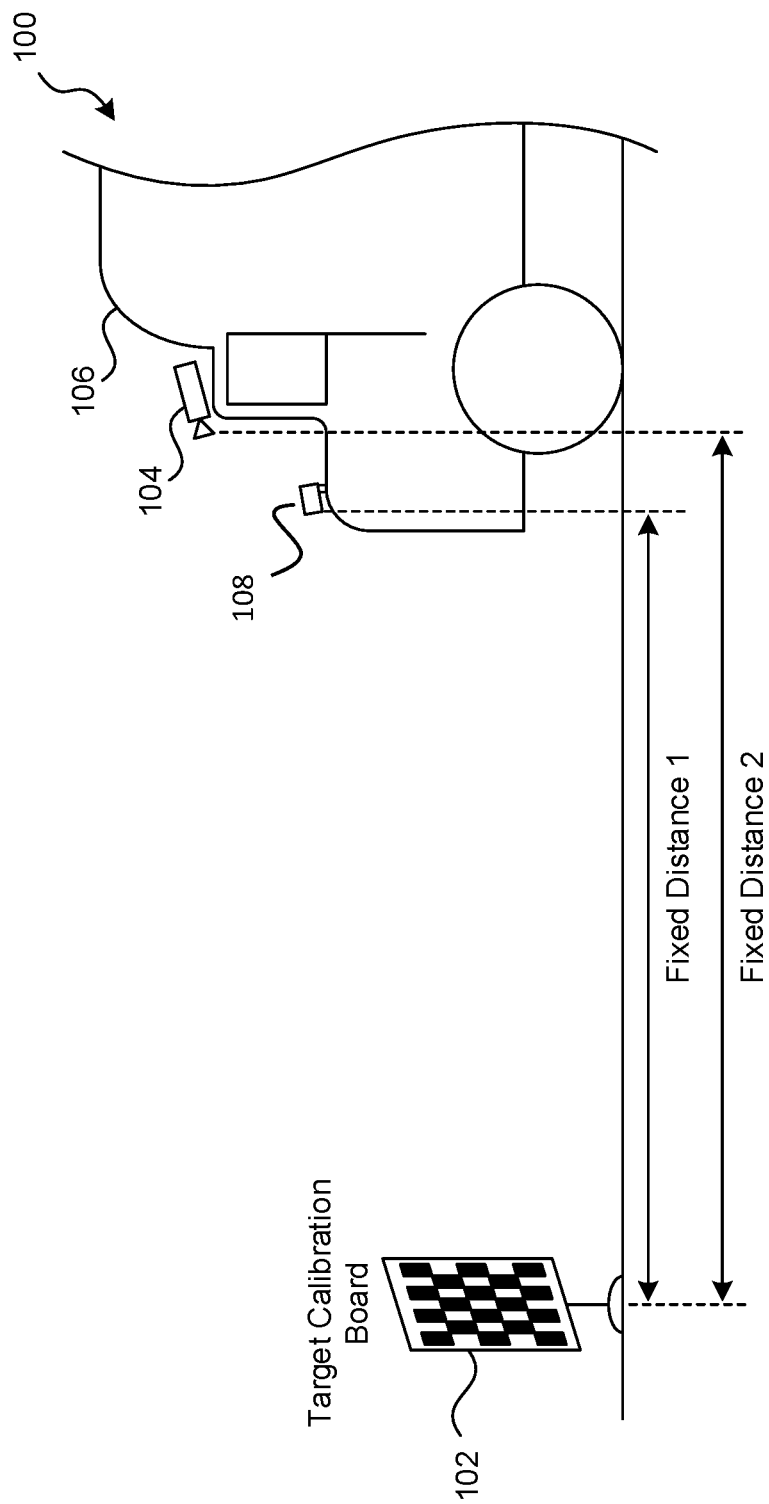
FIG. 1A shows a related calibration system to perform a static calibration operation with a camera on a vehicle.

FIG. 1A shows a related calibration system 100 to perform a static calibration operation with a camera on a vehicle. In the related calibration system 100, a vehicle 106 is first driven to a location where a target calibration board 102 is located. The target calibration board 102 has a pre-defined pattern of black and white squares. Furthermore, the target calibration board 102 is located at a fixed distance from the vehicle 106 so that the distance from the camera 104 and LiDAR sensor 108 and the target calibration board 102 is fixed. The camera 104 can take several pictures of the target calibration board 102, and the LiDAR sensor 108 can scan the region in front of the vehicle 106 comprising the target calibration board 102. The computer on-board the vehicle 106 can use space geometry relation to calculate the distance between the target calibration board 102 and the camera 104, and the distance between the target calibration board 102 and the LiDAR sensor 108. Such process needs to be performed repeatedly for each pair of camera and LiDAR and cannot be used to calibrate multiple pairs of sensors with IMU.

Figure 1B:
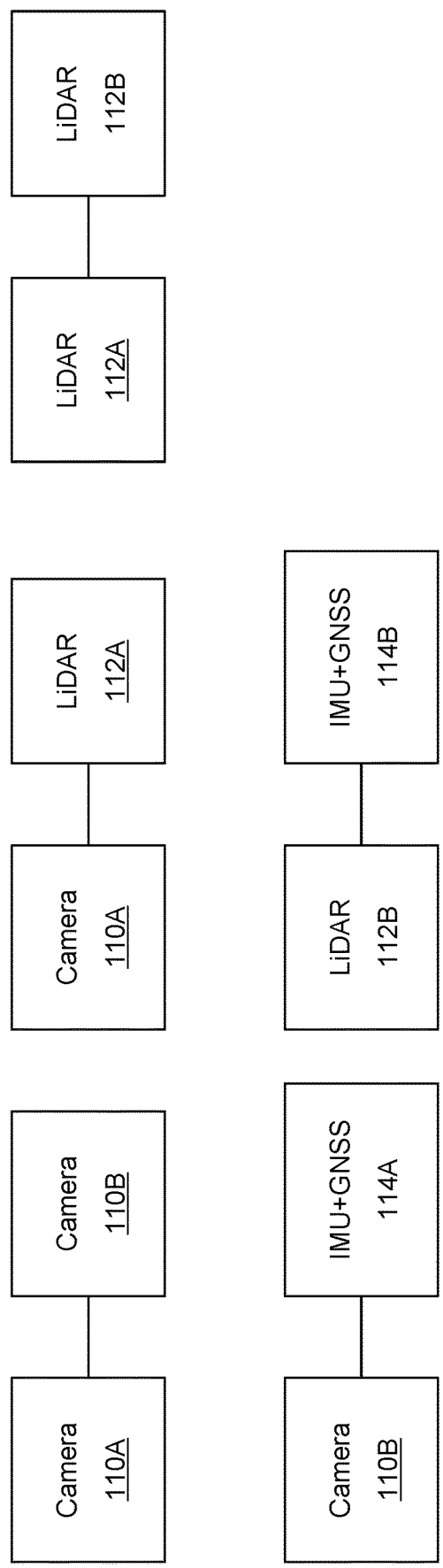
FIG. 1B shows a related pairwise calibration technique.

However, a related calibration system, like the related calibration system 100 described in FIG. 1A, needs to have one or more target calibration boards that need to be properly setup (e.g., proper position and proper orientation) at one or more distances from the location of the vehicle. Such a system can be cumbersome to setup and can even lead to inaccurate calibrate if the target calibration board(s) are not located or positioned (e.g., angled) where they need to be. Second, while FIG. 1A shows a related calibration system with one camera 104 and one LiDAR sensor 108 for ease of description, a related calibration system includes multiple cameras and LiDAR sensors that are calibrated in a pairwise manner as shown in FIG. 1B. In a related calibration pairwise calibration, a camera 110A is calibrated with another camera 110B using images captures by the cameras 110A-110B, a LiDAR 112A is calibrated with the camera 110A using image captured by camera 110A and point cloud data captured by LiDAR 112A, and so on. In practice, the accuracy of the target calibration board corner detection in both camera and LiDAR is not perfect, there is a small error for each calibration, and consequently, it does not have mathematical accuracy to the cyclic consistency among three sensors.

Figure 1C:
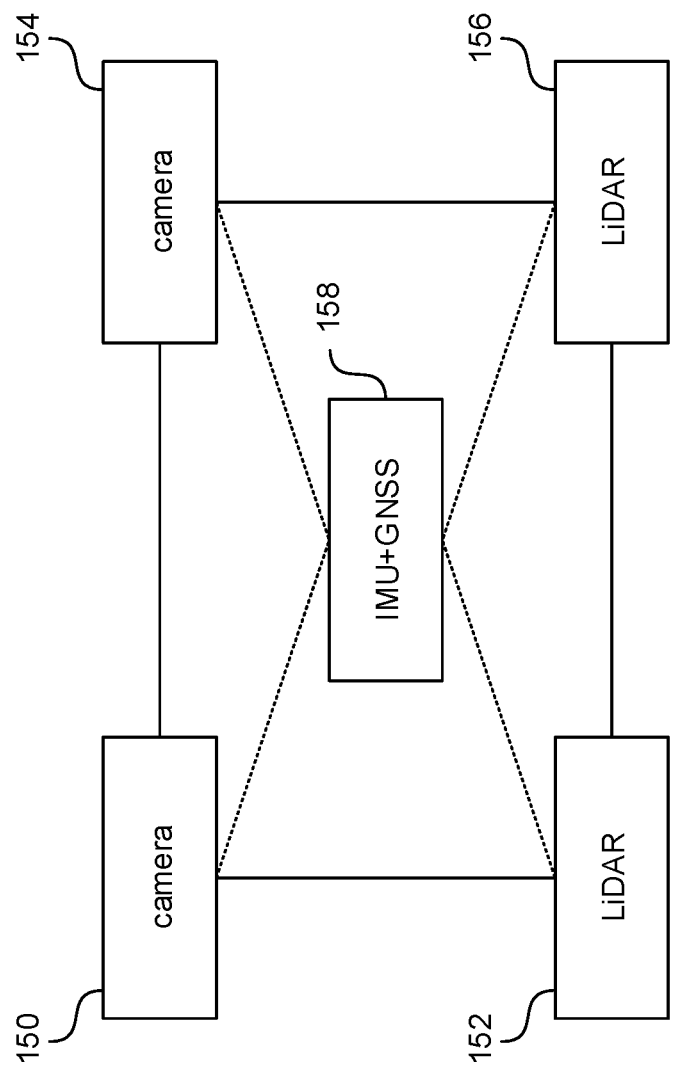
FIG. 1C shows a functional block diagram of sensors located in a vehicle and calibrated using an exemplary technique.

FIG. 1C shows a functional block diagram of sensors located in a vehicle and calibrated using an exemplary technique. A related calibration technique can include a first camera 150 and a first LIDAR sensor 152 can be calibrated together using a first set of measurements obtained by the first camera 150 and first LiDAR sensor 152 of the area including the target calibration board; the first camera 150 and a second camera 154 can be calibrated using a second set of measurements obtained by the cameras 150, 154 of the area including the target calibration board; the first LiDAR sensor 152 and the second LiDAR sensor 156 can be calibrated using a third set of measurements obtained by the LiDAR sensor 152, 156 of the area including the target calibration board; and the first camera sensor 150 and an inertial measurement unit-global navigation satellite system (IMU-GNSS) sensor 158 can be calibrated using a fourth set of measurements obtained by the first camera sensor 150 and the IMU-GNSS sensor 158 of the area including the target calibration board. The first, second, third, and fourth set of measurements are obtained at separate points in time during a calibration session. Thus, such a pairwise calibration technique can not only be computationally intensive, but also time consuming. The techniques described in the present document may be used by some embodiments to solve the above-discuss problems, and others.

Exemplary multi-sensor calibration techniques that can calibrate multiple sensors using simultaneous measurements obtained from the multiple sensors during a calibration session, are described. The obtained measurements can be used to calibrate multiple types of sensors such as cameras and LiDAR sensors.

Figure 2:
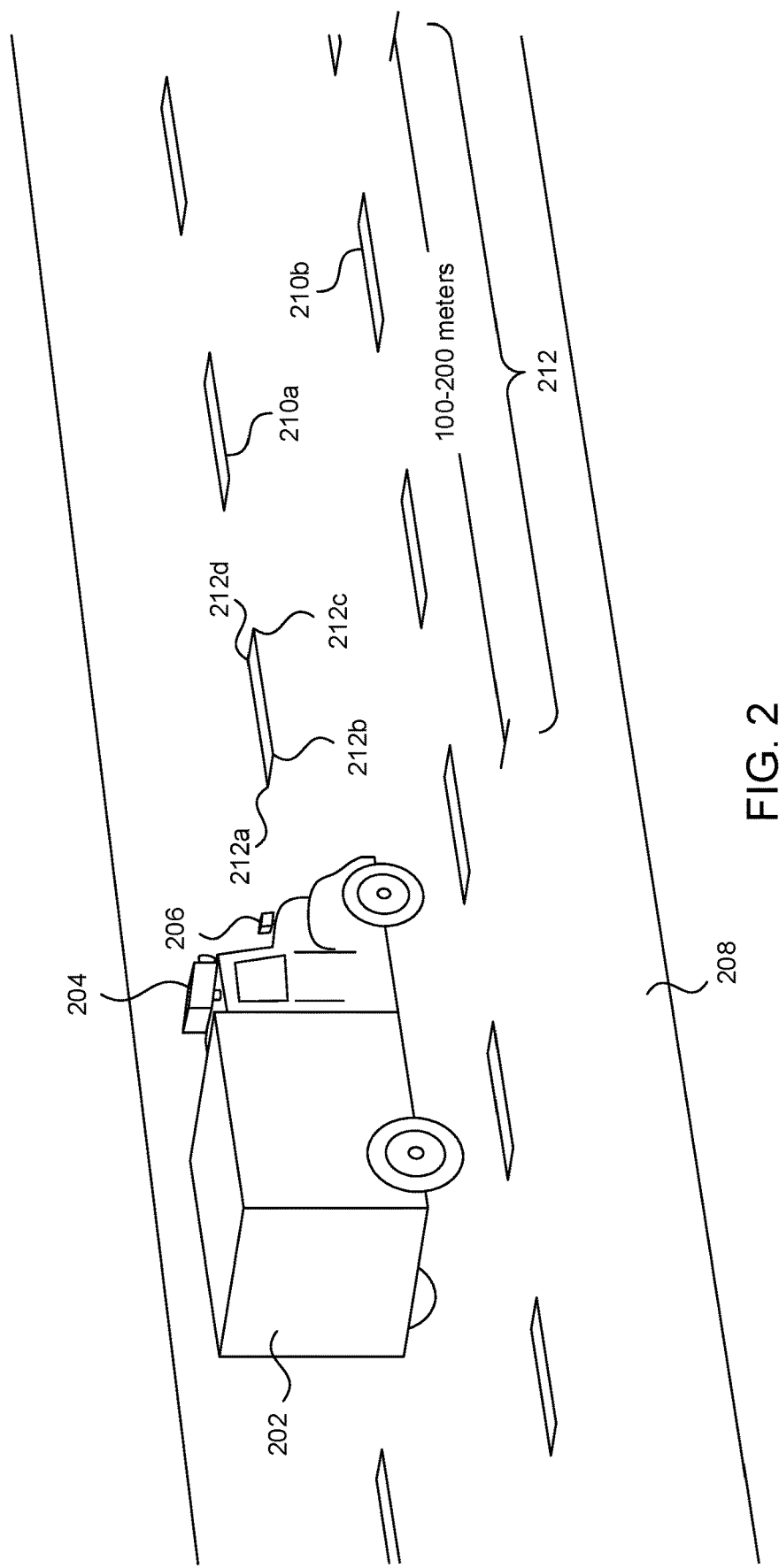
FIG. 2 shows an exemplary multi-sensor calibration system.

FIG. 2 shows an exemplary multi-sensor calibration system 200 that includes a vehicle 202 on a road 208, where the vehicle 202 includes a plurality of cameras and a plurality of LiDAR sensors. In FIG. 2, a single camera 204 and a single LiDAR sensor 206 is shown for ease of description. However, the plurality of cameras and the plurality of LiDAR sensors can be located on or positioned on the vehicle 202 to obtain sensor data items of a calibration road segment 212 towards which the vehicle 202 can be driven. The calibration techniques described herein for the camera 204 and LiDAR sensor 206 can be applied to other sensors (e.g., other cameras and other LiDAR sensors) that are located on the vehicle 202 and can obtain sensor data items of the calibration road segment 212. The vehicle 202 can be an autonomous vehicle.

The road 208 includes a calibration road segment 212 that has lane markers that can be affixed on either side of the road 208. The lane markers include a first set of lane blocks 210*a* located on a first side of the road 208, and a second set of lane blocks 210*b* located on a second side of the road 208 opposite to the first side. In each set of lane blocks, one lane block can be separated from another lane block by a predetermined distance to form a set of broken lines on the road. A lane block 210*a*, 210*b* can have a rectangular shape and can have a white color. As shown in FIG. 2, the first and second set of lane blocks 210*a*, 210*b* can be parallel to each other and can extend for a length of 100 meters, 150 meters, or 200 meters to enable a computer located in the vehicle 202 to perform the multi-sensor calibration techniques described in some embodiments.

The road 208 can be straight (as shown in FIG. 2) and can have an even top surface so that the sensors located on the vehicle 202 can easily obtain sensor data items of the calibration road segment 212. In some embodiments, the road 208 with a calibration road segment 212 can be a built as a private road outside or in a facility where the vehicle 202 is parked so that when the vehicle 202 is turned on to drive to a destination, the multiple sensors on the vehicle 202 can be calibrated on the private road. In some other embodiments, the road 208 can be a public road where the calibration road segment 212 excludes an area with a stop sign or a traffic light where broken lines are absent. The road 208 can be selected or built so that the vehicle 202 can be driven across the calibration road segment 212 at approximately a constant speed to enable the sensors located on the vehicle 202 to obtain sensor data items of the calibration road segment 212 at a steady rate.

Figure 10:
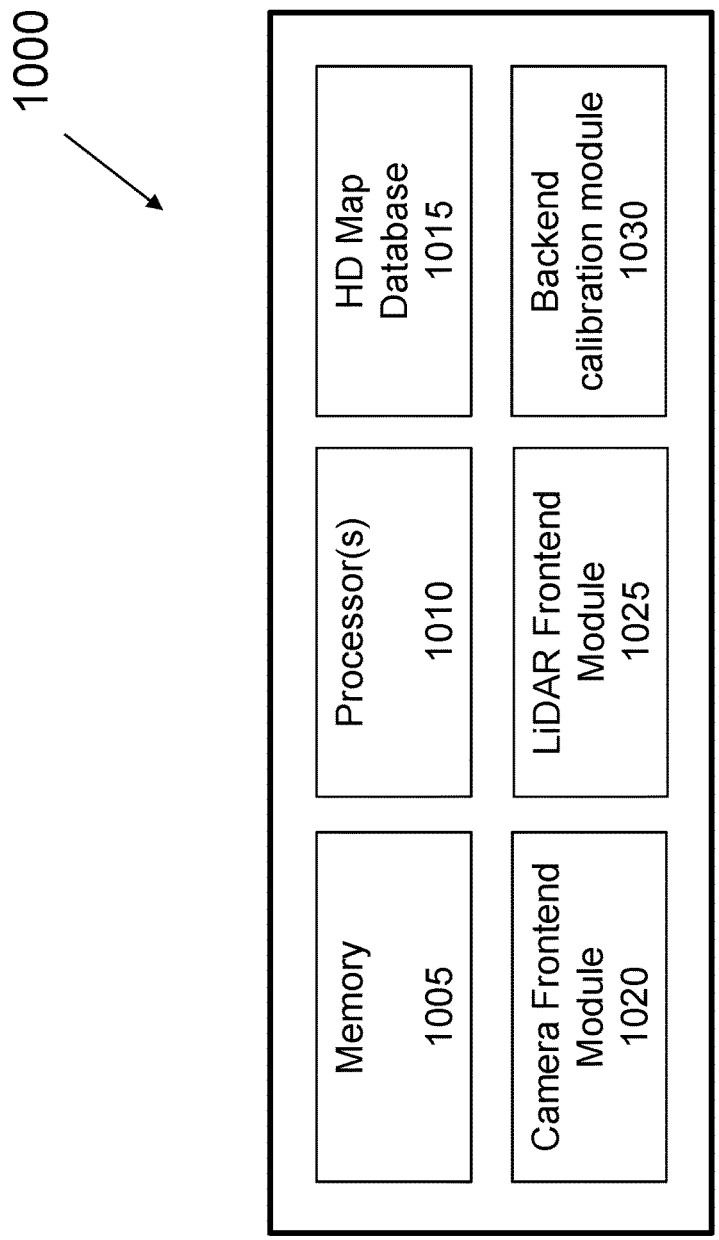
FIG. 10 shows an exemplary block diagram of a computer located in a vehicle to perform multi-sensor calibration techniques.

Located in the vehicle 202 is a computer that stores a high-definition (HD) map (shown as "HD map database 1015" in FIG. 10). The HD map database includes the three-dimensional (3D) world coordinates of each corner 212*a*-212*d* of each lane block. The HD map database also includes a unique identifier of each lane corner of each lane block, a unique identifier for each lane block, and a LiDAR point cloud map of the calibration road segment 212 represented in an earth reference.

Figure 3:
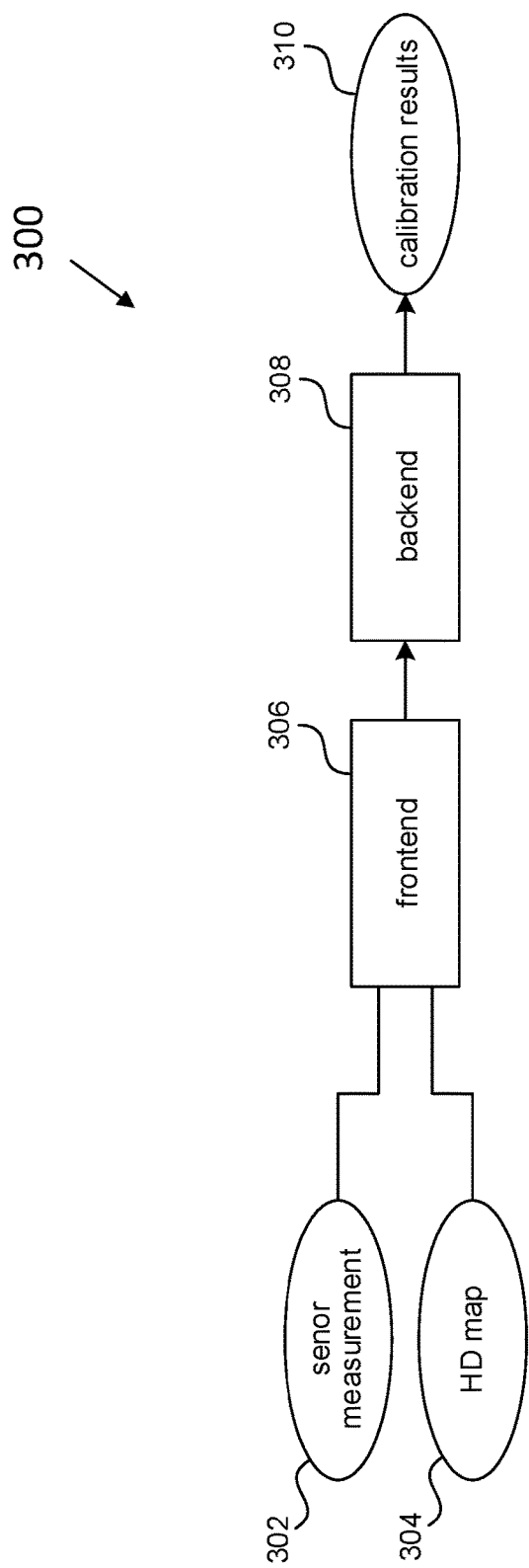
FIG. 3 shows an overview of signal processing and pose estimation operations for an exemplary multi-sensor calibration technique.

FIG. 3 shows an overview of signal processing and pose estimation operations for an exemplary multi-sensor calibration technique 300. A vehicle includes sensors (e.g., cameras and LiDAR sensors) that can each obtain a sensor measurement 302 of a calibration road segment as the vehicle can be driven towards or located adjacent to and facing the calibration road segment (as described in FIG. 2). An exemplary multi-sensor calibration technique 300 can perform signal processing on the sensor measurement in frontend signal processing 306 and pose estimation in backend optimization 308. As further described in some exemplary embodiments, a computer located in the vehicle can perform the frontend signal processing 306 and backend optimization 308 to obtain calibration results 310 for each sensor measurement 302 based on the information about the lane blocks in the HD map database 304. The operations associated with the frontend signal processing 306 extracts lane block corners from images obtained from cameras and point cloud obtained from LiDAR sensors, and associates the extracted corners with 3D world coordinates of those corners obtained from the HD map database 304. Given such associations of lane block corners, the operations associated with backend optimization 308 can be performed to estimate the extrinsic parameters for multiple sensors (e.g., cameras, LiDAR sensors, and IMU-GNSS).

The example headings for the various sections below are used to facilitate the understanding of the disclosed subject matter and do not limit the scope of the claimed subject matter in any way. Accordingly, one or more features of one example section can be combined with one or more features of another example section.

I.(a) Frontend Signal Processing For Images Obtained from Cameras

Figure 4:
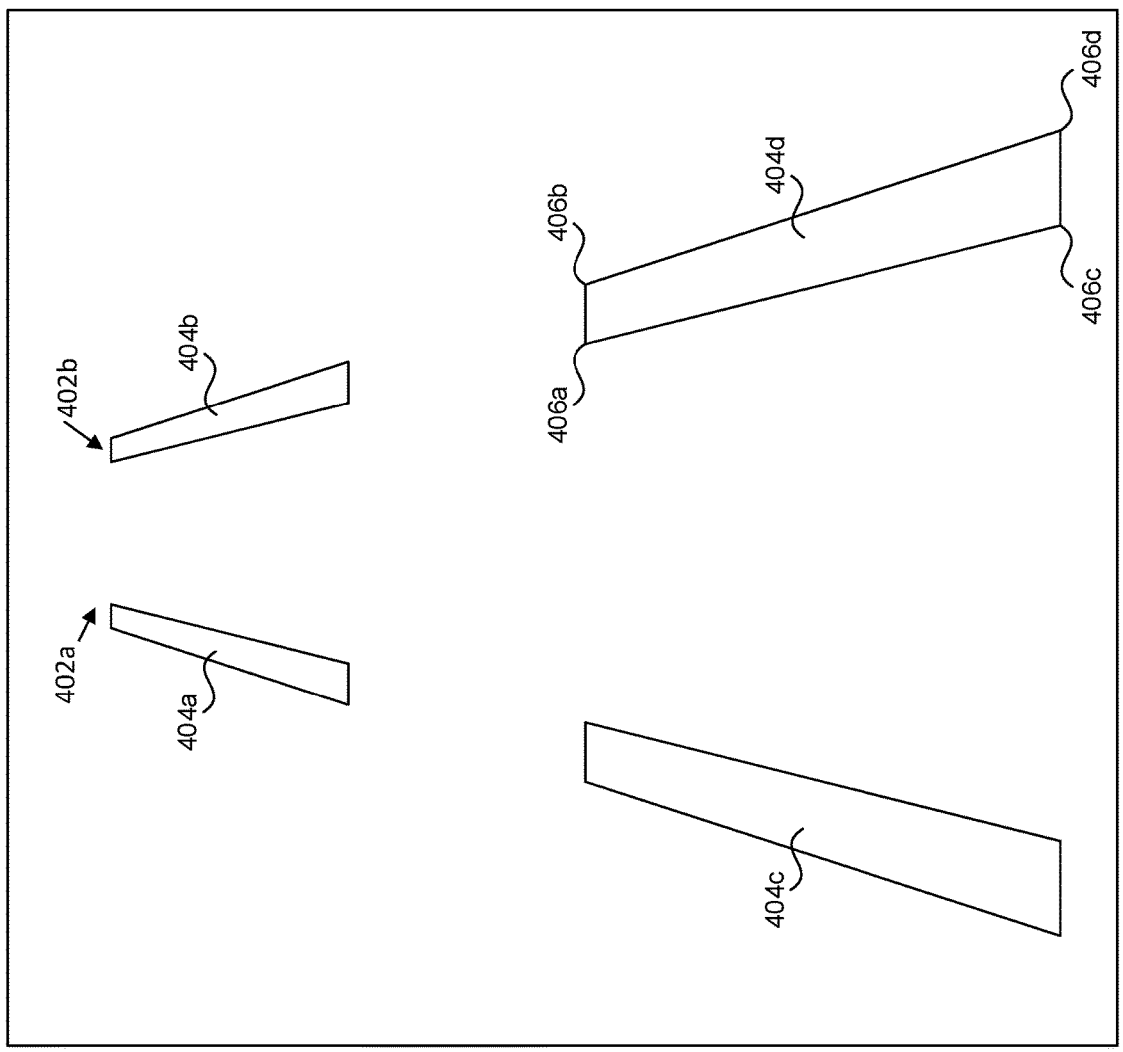
FIG. 4 shows an example of an image obtained from a camera where the image includes a plurality of lane blocks on either side of a road.

FIG. 4 shows an example of an image obtained from a camera where the image includes a plurality of lane blocks on either side of a road. A camera frontend module (shown as "1020" in FIG. 10) included in a computer located in the vehicle can detect in an image two broken lanes 402*a*, 402*b*, a plurality of lane blocks 404*a*-404*b*, and a plurality of lane corners 406*a*-406*d* for each lane block. In an exemplary implementation, a deep neural network can be used to detect the two broken lanes 402*a*, 402*b*, the plurality of lane blocks 404*a*-404*b*, and the plurality of lane corners 406*a*-406*d* for each lane block.

Figure 5:
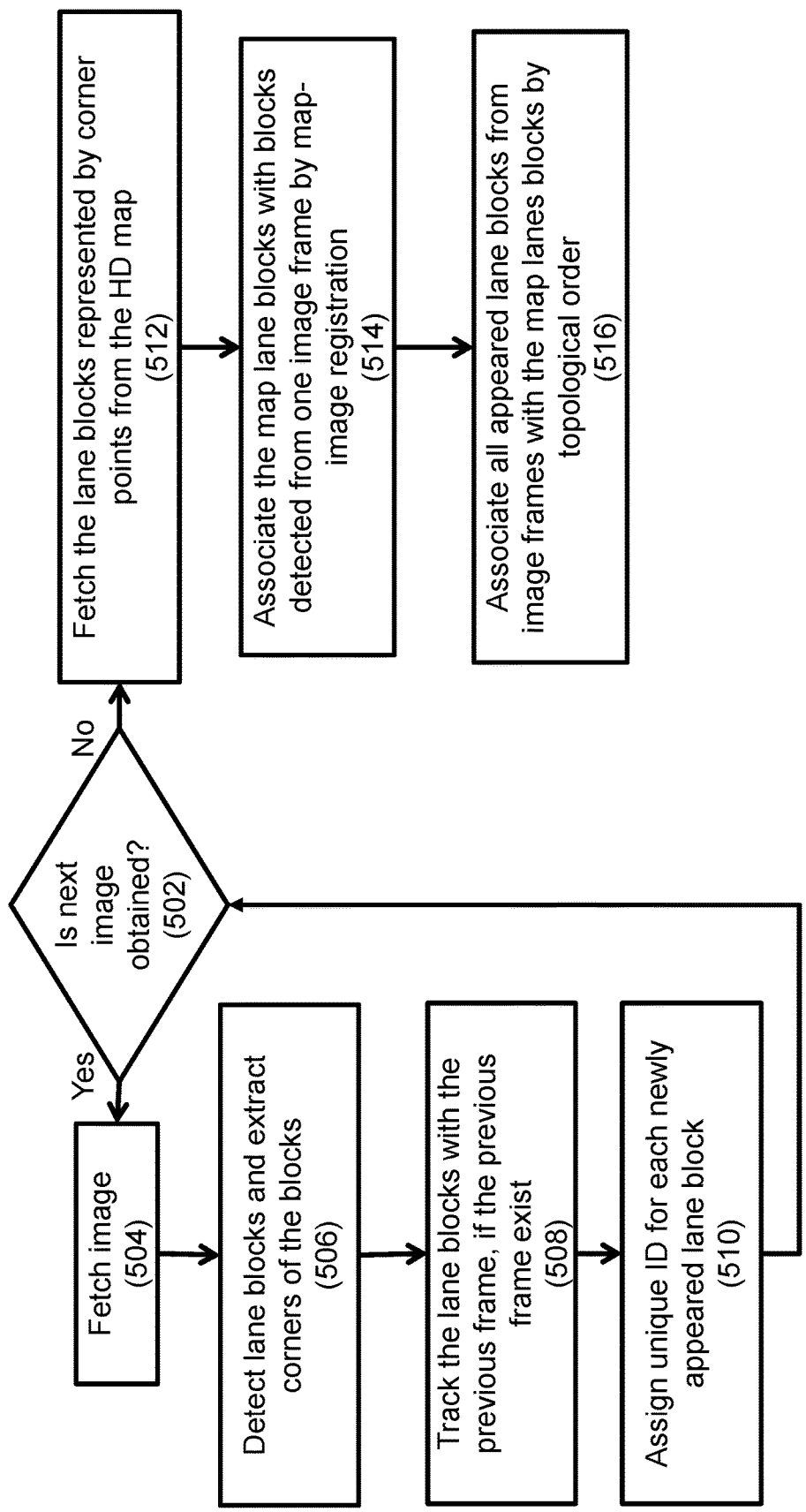
FIG. 5 shows an exemplary flow diagram of operations performed by a camera frontend module.

FIG. 5 shows an exemplary flow diagram of operations performed by a camera frontend module. At operation 502, the camera frontend module determines if the next image is obtained from a camera. If the camera frontend module determines that a next image is obtained at operation 502, the camera frontend module performs operations 504 to 510. And, if the camera frontend module determines that a next image is not obtained, the camera frontend module performs operations 512 to 516.

At operation 504, the camera frontend module obtains the next image captured by the camera. At operation 506, the camera frontend module detects lane blocks and extracts corners of the blocks. At operation 508, the camera frontend module tracks the lane block from a previous image frame if such a previous image frame exists. At operation 510, the camera frontend module assigns unique identifiers for each newly appeared lane block. After operation 510, the camera frontend module performs operation 502 again.

At operation 512, the camera frontend module fetches or obtains the lane blocks represented by corner points from the HD map. At operation 514, the camera frontend module associates the HD map obtained lane blocks with blocks detected from one image frame by map-image registration. At operation 516, the camera frontend module can associate all appeared lane blocks from image frames with the map lanes blocks by topological order.

In an example implementation, the camera frontend module can order the lane blocks detected in an image from bottom to top for each broken lane. The camera frontend module can order the lane blocks from bottom to top for each broken lane according to the detected pixel positions of the lane blocks in the image plane. The camera frontend module can determine or assign one or more unique lane block identifier to one or more lane blocks located at a bottom of the image based on information obtained from the HD map database. The camera front end module can also infer the unique lane block identifiers for others lane blocks in the image according to pixel locations in the image plane (e.g., being above the one or more lane block located at the bottom of the image).

In some embodiments, it may be computationally intensive and difficult for the camera frontend module to associate a detected lane block from every image and a lane block identifier of the detected lane block from the HD map database at least because accurate extrinsic parameters of camera-IMU-GNSS may not be known before performing the multi-sensor calibration technique. It may be computationally more feasible and easier to associate a set of lane blocks detected from one image to their corresponding lane blocks from the HD map. In such embodiments, a manual association may be formed for a set of one or more lane blocks located in a first image obtained by the camera. For example, a driver or a person performing the calibration can use the computer located in the vehicle to manually associate the first set of one or more lane blocks with one or more lane block identifiers from the HD map database.

In some embodiments, the camera frontend module can determine a presence of one or more lane blocks identified from an image obtained from the camera in a previous image obtained from the camera by, for example, estimating a homography between successive frames by RANSAC framework with point features. After the camera frontend module performs the homography operation, the camera frontend module can wrap the previous image frame to the current image frame. If the camera frontend module determines that the intersection-over-union (IoU) between a lane blocks from a current image frame and another lane block from a previous image frame is large (e.g., over 80%), then the two lane blocks in the previous and current image frames can be considered to be the same.

In some embodiments, for successfully tracked lane blocks between two or more image frames, the camera frontend module can assign lane block identifiers for successfully tracked lane blocks. In such embodiments, the lane block identifiers are the same as those assigned to the lane blocks in the previous frame. In some other embodiments, for untracked or new lane blocks in a current image frame not present in the previous image frame, the camera frontend module can assign lane block identifier for untracked lane blocks according to the lane block identifiers of the tracked lane blocks.

Figure 6:
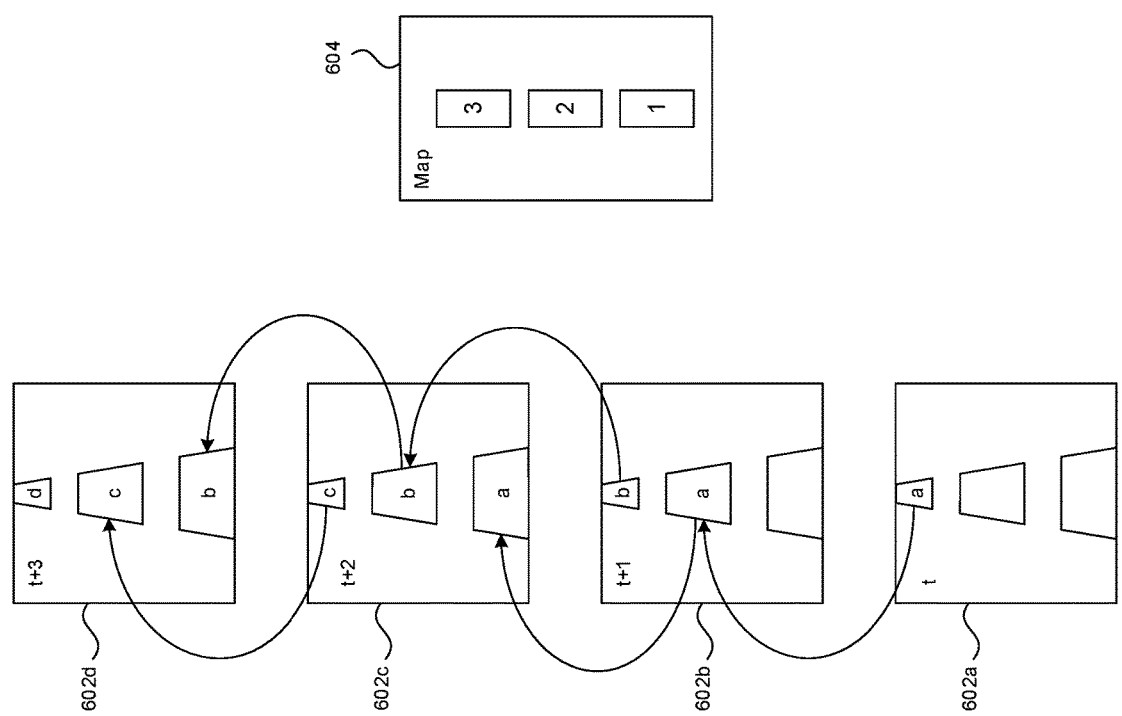
FIG. 6 shows an exemplary frontend signal processing to identify tracked and untracked lane blocks in a plurality of images obtained from a camera as a vehicle is traveling towards a calibration road segment.

FIG. 6 shows an exemplary frontend signal processing to identify tracked and untracked lane blocks in a plurality of images obtained from a camera as a vehicle is traveling towards a calibration road segment (as described in FIG. 2). FIG. 6 shows four images 602a-602d obtained from a camera located on a vehicle. As shown in FIG. 6, each image can include a plurality of lane blocks arranged in a broken line. The camera frontend module can detect and assign alphabet "a" to index a lane block in image plane. The camera frontend module can use numbers to index the lane blocks in HD map database 604. Thus, in an example implementation, the camera front end module can associate the lane block "a" from the image to lane block "1" in the HD map database 604 based on a location (e.g., latitude, longitude, and/or altitude) and attitude (e.g., pitch, yaw, and/or roll) of the vehicle that can be obtained from IMS-GNSS sensor.

For the plurality of images 602a-602d, the camera frontend module can generate a list of associations between the lane blocks in the images 602a-602d and the lane blocks in the HD map database 604. For example, the camera frontend module can use symbol <a, 1> to represent a matched pair of lane blocks between the image 602a, 602b and the HD map database 604. At time t, the camera frontend module can generate <a, 1>, at time t+1, the camera frontend module can track or determine that lane block "a" in image 602b is the same as lane block "a" in image 602a. Thus, for image 602b at time t+1, the camera frontend module can generate a symbol for lane block "b" as <b, 2> since lane block "b" is the upper neighbor of lane block "a" and lane block "2" is the upper neighbor of lane block "1" in HD map database 604. At time t+2, the camera frontend module can determine that lane blocks "a" and "b" have been tracked in image 602c, and the camera frontend module can generate a symbol for lane block "c" as <c, 3> since lane block "c" is the upper neighbor of lane block "b" and lane block "3" is also the upper neighbor of lane block "2" in HD map database 604, and so on.

The camera frontend module can assign lane corner identifiers for each lane block detected by the camera frontend module in the images obtained from the camera. In FIG. 6, if the camera frontend module determines <a, 1> a lane block identified in an image 602a, then the four corners of the lane block "a" can be assigned identifiers to be the same as the corner identifiers of lane block "1" in the HD map database 604.

I. Frontend Signal Processing

I.(b) Frontend Signal Processing For Sensor Data Item Obtained from LiDAR Sensors Extracting lane corners from point cloud measurement obtained by LiDAR sensors can be difficult due to the sparsity of point clouds for currently used 32-line or 64-line LiDAR sensors. To overcome this problem, multiple frames of point cloud can be obtained to obtain a dense point cloud. However, to accumulate dense point clouds, accurate LiDAR poses for each frame should be known. The LiDAR poses can be derived from IMU+GNSS sensor measurements and LiDAR-IMU extrinsic parameter. However, to complete multi-sensor calibration, dense point clouds need to be accumulated, but to accumulate dense point clouds, the calibration technique needs an accurate LiDAR-IMU extrinsic parameter, which is the parameter that needs to be solved by obtaining the dense point cloud.

Figure 7:
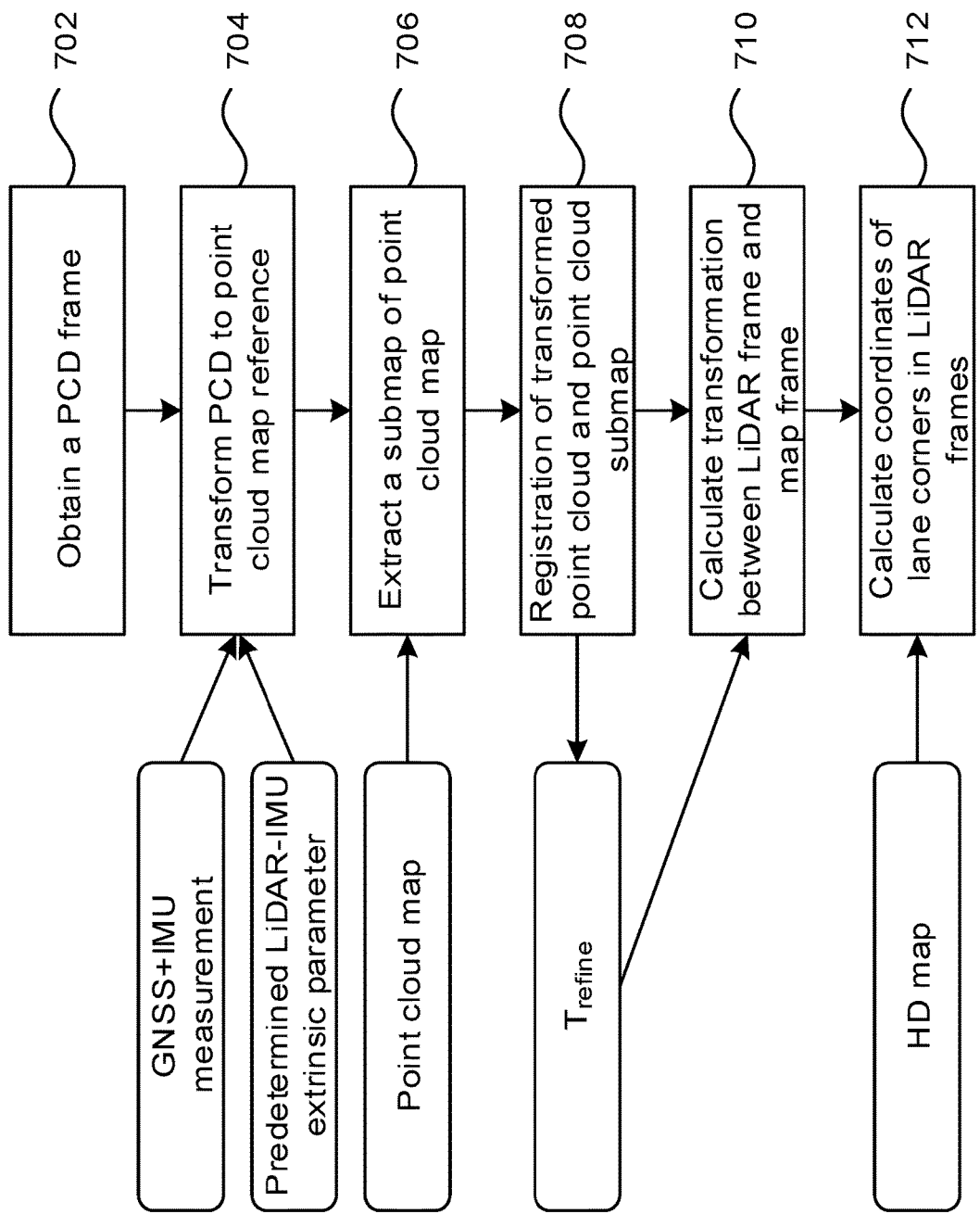
FIG. 7 shows an exemplary flowchart of operations performed by a LiDAR frontend module.

FIG. 7 shows an exemplary flowchart of operations performed by a LiDAR frontend module (shown as "1025" in FIG. 10). At operation 702, the LiDAR frontend module obtains point cloud data (PCD) of a frame obtained from measurements performed by a LiDAR sensor as a vehicle can be driven on a road towards or located adjacent to and facing the calibration road segment. As an example, a LiDAR sensor located on a vehicle can obtain in sensor measurements in a plurality of frames, where each frame includes PCD of at least a part of a calibration road segment (as described in FIG. 2).

At operation 704, the LiDAR frontend module obtains a transformed single scan point cloud by registering the single point cloud obtained at operation 702 to a point cloud map reference using well developed techniques such as Iterative Close Point (ICP) and/or Normal Distribution Transform (NDT). A point cloud map reference may be a previously obtained point cloud map reference that includes 3D world coordinates of various points previously obtained in a spatial region comprising the road that includes the calibration road segment, where the 3D world coordinates can be obtained by a LiDAR. The point cloud map reference may be stored in the HD map database so that the 3D world coordinates of the point cloud map reference can be obtained by the LiDAR frontend module from the HD map database. The obtained single scan point cloud is transformed to one or more point cloud map reference points at least because the LiDAR sensor and the IMU+GNSS sensor may be located in different regions of the vehicle and because the previously obtained point cloud map reference (further described in operation 706) describes 3D point cloud information of the road comprising the calibration road segment from the location or perspective of the IMU+GNSS sensor on the vehicle.

The single scan point cloud obtained at operation 702 can be transformed to one or more point cloud map reference points based on a GNSS+IMU sensor provided measurement information (e.g., latitude, longitude, altitude, heading direction, pitch angle and/or yaw angle of the vehicle) and previously stored or coarse LiDAR to IMU extrinsic parameters $T_{lidar}^{imu}$. The previously stored LiDAR to IMU extrinsic parameters can describe a spatial relationship (e.g., angles or positions) of the LiDAR sensor and the IMU-GNSS sensor located on or in the vehicle or can describe the relationship between the positions or orientations of the LiDAR sensor and the IMU-GNSS sensor. The position of one or more points of the point cloud map reference are described with reference to the position of the IMU-GNSS sensor on the vehicle, whereas the PCD describes the position of various points with reference to the LIDAR sensor. The IMU-GNSS and LiDAR sensor may be located at different places on the vehicle and having different orientations. Thus, the transformation of the PCD to one or more point cloud map reference points is performed to correlate the PCD to the previously obtained dense point cloud map reference.

In some embodiments, a PCD frame refers to single scan point cloud, the transformed PCD refers to transformed single scan point cloud, and the point cloud map and the point cloud submap refer to the 3D point cloud map which is usually generated from the LiDAR data.

At the extracting operation 706, the LiDAR frontend module can extract a submap from the previously obtained point cloud map that includes dense point cloud of the road comprising the calibration road segment, where the LiDAR frontend module extracts the submap based on a location of the vehicle that can be obtained from the GNSS+IMU sensor. A previously obtained point cloud map includes 3D world coordinates of various points previously obtained of the road comprising the calibration road segment, where the 3D world coordinates can be obtained by a LiDAR. The previously obtained point cloud map may be stored in the HD map database so that the 3D world coordinates of the previously obtained point cloud map can be obtained by the LiDAR frontend module from the HD map database. Thus, the previously obtained point cloud map generated from LiDAR data that can provide point cloud information within a region of about 150-200 meters in front of the vehicle. The submap can be extracted to identify a region within a pre-determined distance of a location of the vehicle (e.g., within 50 meters in front of the location of the vehicle) when the single scan point cloud is obtained at operation 702. Extracting a submap is a beneficial technical solution at least because it reduces the amount of computation by registering the transformed point cloud map with a portion of the complete point cloud map. The submap is used by the LiDAR frontend module to register with the transformed single scan point cloud obtained from operation 704.

At operation 708, the transformed single scan point cloud is registered with the 3D point cloud submap to perform a fitting operation where information from transformed single scan point cloud is fitted to or correlated to the 3D point cloud submap. Registration methods may include normal distribution transform (NDT) and/or iterative closest point (ICP). The LiDAR frontend module can denote the transformation matrix provided by performing the registration at operation 708 as $T_{refine}$. The $T_{refine}$ parameter is used to compare to the pre-determined LiDAR-Imu extrinsic parameter in operation 704.

At operation 710, the LiDAR frontend module calculates the transformation between a single scan point cloud obtained by the LiDAR sensor and a portion of the 3D point cloud map by solving for transformation matrix(es) $T_{imu}^{map} T_{lidar}^{imu}$ in Equation (1). Operations 702-708 built up a series of transformations, and the LiDAR frontend module can calculate the composition of the transformations describes therein. The LiDAR frontend module can denote $P_{map}$ and $P_{lidar}$ as the coordinates of a point in map reference and LiDAR reference, respectively.

$$P_{map} = T_{refine} \, T_{imu}^{map} T_{lidar}^{imu} P_{lidar} \qquad \text{Equation (1)}$$

where $T_{lidar}$ is the transformation between LiDAR frame (or translation and orientation of the LiDAR) to the IMU+GNSS frame (as an origin/reference point of IMU+GNSS sensor) which is obtained by previously stored or coarse LiDAR to IMU extrinsic parameters. $T_{imu}^{map}$ is the transformation between IMU-GNSS reference and one or more points of the point cloud map reference (e.g., ENU or east-north-up reference).

At operation 712, the LiDAR frontend module calculates 3D world coordinates of the lane corners of each lane block. The LiDAR frontend module can obtain from the HD map database the 3D world coordinates of each lane corner. The LiDAR frontend module can solve Equation (2) for each lane corner to obtain the 3D world coordinates of each lane corner in the LiDAR frame. In Equation (2), the HD map database lane corner coordinates obtained from the HD map database can be included in $P_{map}$.

$$P_{lidar} = T_{imu}^{lidar} T_{map}^{imu} T_{refine}^{-1} P_{map} \qquad \text{Equation (2)}$$

Based on the above described techniques, the 3D world coordinates and lane corner identifiers in LiDAR reference can be obtained by transforming lane corners in the point cloud map reference.

II. Pose Estimation in Backend Optimization

Figure 8:
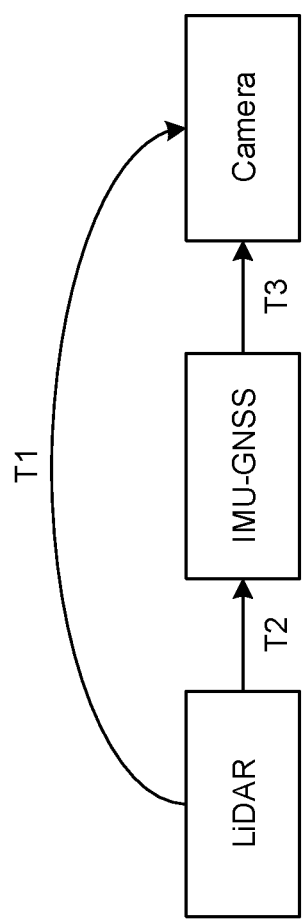
FIG. 8 shows multi-sensor calibration constraints.

The backend optimization operations (as described in FIG. 3) can be performed by a backend calibration module (shown as "1030" in FIG. 10) to enable consistent and accurate calibration of all sensors. The backend calibration module can perform operations to simultaneously calibrate multiple sensors to optimize the extrinsic parameter. FIG. 8 shows multi-sensor calibration constraints, where T1=(T2 o T3), where the symbol "o" represents some operator of adding T2 and T3, and where T1, T2, and T3 describe extrinsic parameters of one sensor relative to the extrinsic parameter another sensor. For example, as shown in FIG. 8, the extrinsic parameters between a camera and a LiDAR (T1) can be equivalent to the extrinsic parameters from that camera to the IMU-GNSS (T3) added to the extrinsic parameters from the IMU-GNSS to the LiDAR (T2). Since the IMU extrinsic parameters may be previously calibrated, this can provide a trustworthy localization information, and trustworthy information from the HD map.

Using the techniques described in Section II, the backend calibration module can calculate extrinsic parameters of sensors (e.g., camera, LiDAR) located on a vehicle based on determining a difference between the location information of the lane marker from each sensor data item (e.g., image obtained from camera and PCD obtained from LiDAR sensor) and a previously stored location information of the lane marker.

An extrinsic matrix is a 4×4 matrix is shown below and is composed of 3 degrees of freedom (DoF) translations and 3 DoF rotations which can be represented with lie algebra as a 3×3 rotation matrix. The variable r indicates elements of the 3×3 rotation matrix and the variable t indicates the 1×3 translation vector.

$$\begin{bmatrix} r_{11} & r_{12} & r_{13} & t_x \\ r_{21} & r_{22} & r_{23} & t_y \\ r_{31} & r_{32} & r_{33} & t_z \\ 0 & 0 & 0 & 1 \end{bmatrix}$$

Each transformation matrix from one sensor to another can be represented as a rotation and translation matrix. For example, if a vehicle includes three cameras, two LiDARs and two IMUs, there can be 12 transformation matrixes for the backend calibration module to estimate.

II.(a) Intrinsic and Extrinsic Parameters

The intrinsic and extrinsic parameters can be described as follows:

The camera affine transformation:
$\mathcal{H} = [R \in \mathfrak{R}^2 | T \in \mathfrak{R}^2]$ The camera intrinsic and distortion:
$\mathcal{K} \in \mathfrak{R}^5, \mathcal{D} \in \mathfrak{R}^2$ The camera-IMU extrinsic:

$$\mathcal{P}_{IMU}^{Cam} = \begin{bmatrix} \phi^\wedge & \rho \\ 0 & 1 \end{bmatrix} \in SE(3), \phi \in so(3), \rho \in \mathfrak{R}^3, \xi = \begin{bmatrix} \rho \\ \phi \end{bmatrix} \in \mathfrak{R}(6)$$

The LiDAR-IMU extrinsic:

$$\mathcal{P}_{IMU}^{LiDAR} = \begin{bmatrix} \phi^\wedge & \rho \\ 0 & 1 \end{bmatrix} \in SE(3), \phi \in so(3), \rho \in \mathfrak{R}^3, \xi = \begin{bmatrix} \rho \\ \phi \end{bmatrix} \in \mathfrak{R}(6)$$

The LiDAR-Camera extrinsic:

$$\mathcal{P}_{LiDAR}^{Cam} = \begin{bmatrix} \phi^\wedge & \rho \\ 0 & 1 \end{bmatrix} \in SE(3), \phi \in so(3), \rho \in \mathfrak{R}^3, \xi = \begin{bmatrix} \rho \\ \phi \end{bmatrix} \in \mathfrak{R}(6)$$

The LiDAR-LiDAR extrinsic:

$$\mathcal{P}_{LiDAR_j}^{LiDAR_i} = \begin{bmatrix} \phi^\wedge & \rho \\ 0 & 1 \end{bmatrix} \in SE(3), \phi \in so(3), \rho \in \mathfrak{R}^3, \xi = \begin{bmatrix} \rho \\ \phi \end{bmatrix} \in \mathfrak{R}(6)$$

II.(b) Loss Functions

To estimate the parameters described above in Section II.(a), the loss function can be described as following. The loss function can be a sum of least-square of different observations from the at least two distinct sensors (e.g., camera and LiDAR sensor). The road markers can be fetched from the HD-map which becomes an observation of the IMU and can be observed by both camera and LiDAR sensor with some processing as described in some embodiments. The four corner points of one lane blocks can be used for the loss function related operations. The loss is then the sum of Euclidean distance of each corner point captured by different sensors either in 2D or 3D.

Camera—IMU: compute loss from the distance of map points (e.g., 3D world coordinates of lane marker corners obtained from HD map) and image points in 2D image space:

$\mathcal{L} = \Sigma_k{}^C \Sigma_i{}^N \|f(\mathcal{D}_k, \mathcal{K}_k, \mathcal{P}_{IMU}{}^{cam_k} P_i{}^{IMU}) - P_i{}^{img_k}\|_2$ LiDAR—IMU: compute loss from the distance of map points and LiDAR points in 3D space:

$\mathcal{L} = \Sigma_L{}^l \Sigma_i{}^N \|\mathcal{P}_{IMU}{}^{LiDAR_l} P_i{}^{IMU} - P_i{}^{LiDAR_l}\|_2$ Camera—LiDAR: compute loss from the distance of image points and LiDAR points in 2D image space:

$\mathcal{L} = \Sigma_k{}^C \Sigma_l{}^L \Sigma_i{}^N \|f(\mathcal{D}_k, \mathcal{K}_k, \mathcal{P}_{LiDAR_l}{}^{cam_k} P_i{}^{LiDAR_l}) - P_i{}^{img_k}\|_2$ Camera—Camera: compute loss from the distance of points from two images in 2D image space:

$\mathcal{L} = \Sigma_{(k,l)}{}^{Pair} \Sigma_i{}^N \|f(\mathcal{D}_k, \mathcal{H}_k{}^l P_i{}^{img_k}) - P_i{}^{img_l}\|_2$ LiDAR—LiDAR: compute loss from the distance of points from two LiDARs in 3D space:

$\mathcal{L} = \Sigma_{k,l}{}^{Pair} \Sigma_i{}^N \|\mathcal{P}_{LiDAR_k}{}^{LiDAR_l} P_i{}^{LiDAR_k} - P_i{}^{LiDAR_l}\|_2$ The backend calibration module can minimize the loss functions described above to obtain extrinsic parameters for the two sensors. In some embodiments, the backend calibration module can add constraints between image provided by a camera or PCD data of frames provided by LiDAR sensor to provide cyclic consistency between the images and between the PCD data of the frames. The constraint can be described as a form of loss with weight and it is defined as the Frobenius Norm of a multiplication of three transformation matrix. Thus, in order to secure multi-sensor consistency, the following constraints may be added:

Affine constraint: used for cameras with large overlap FOV:

$\|\mathcal{K}_{Cam_i} R_{Cam_i}{}^{IMU} R_{IMU}{}^{Cam_j} \mathcal{K}_{Cam_j}{}^{-1} - \mathcal{H}\|_F$ Camera—LiDAR—IMU consistency constraint with Lie algebra: used for cameras and LiDARs with overlap FOV:

$\|\log(P_{LiDAR}{}^{Cam} P_{IMU}{}^{LiDAR} P_{Cam}{}^{IMU})\|_F$

LiDAR-LiDAR constrains with Lie algebra:

$\|\log(P_{LiDAR_i}{}^{IMU} P_{LiDAR_j}{}^{LiDAR_i} P_{IMU}{}^{LiDAR_j})\|_F$

II.(c) Vanishing Point (VP) Constraint

The VPs can also provide constraints for rotation matrix. Denote the direction vector of the lane in HD map as d, the homogeneous coordinates of lane VP in image plane as v, the intrinsic parameter matrix for camera as K, and rotation matrix from world frame to camera frame as $R_{imu}^{cam}$ The VP constraint can be determined by $v=KR_{imu}^{cam}d$. The constraint can be as follows:

$$\|\Pi(KR_{imu}^{cam}d)-\bar{v}\|_F$$

where $\Pi$ is the projection function which projects a 3D point from homogeneous coordinates to inhomogeneous ones, and $\bar{v}$ is the detected VP in image plane.

Figure 9:
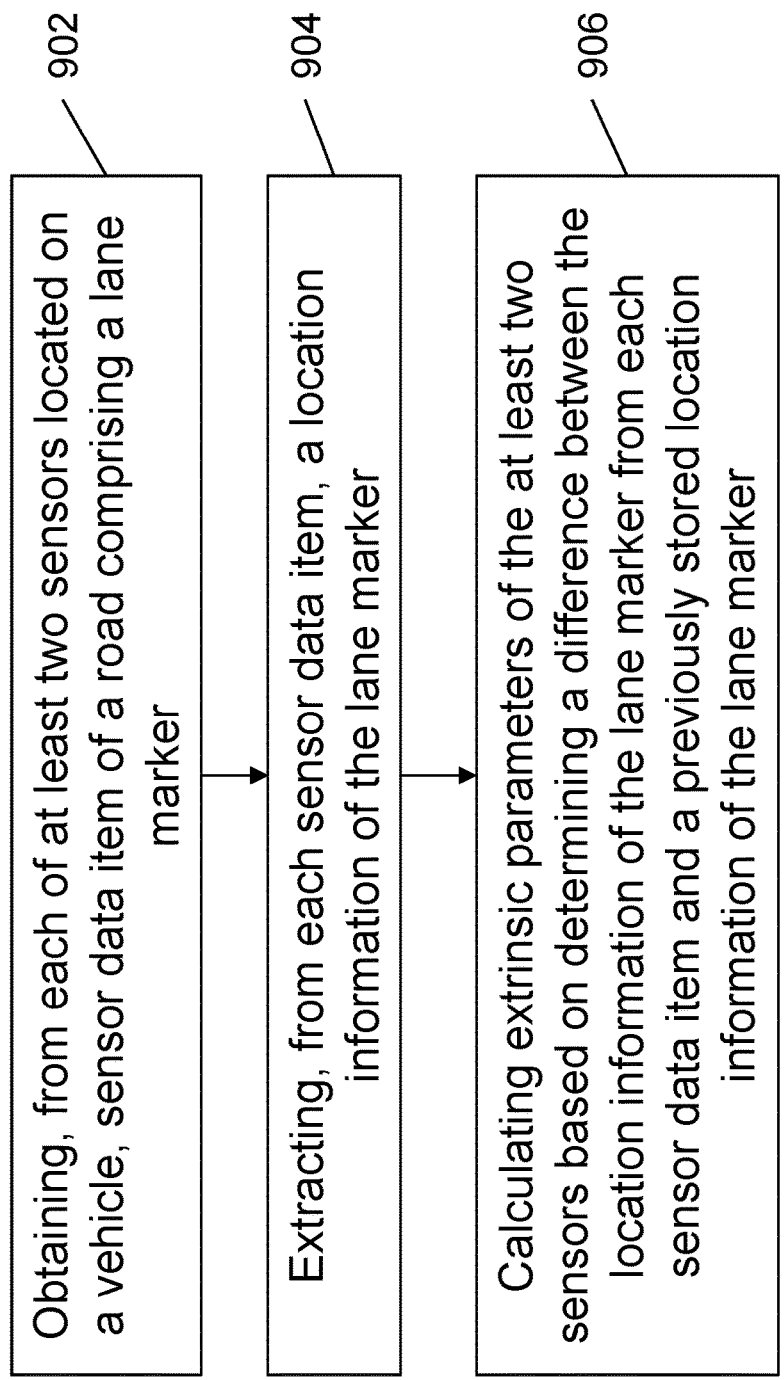
FIG. 9 shows an exemplary flow diagram of performing multi-sensor calibration.

FIG. 9 shows an exemplary flow diagram of performing multi-sensor calibration. At the obtaining operation 902, obtaining, from each of at least two sensors located on a vehicle, sensor data item of a road including a lane marker. At the extracting operation 904, extracting, from each sensor data item, a location information of the lane marker.

In some embodiments, the obtaining sensor data item from each of the at least two sensors and the extracting the location information of the lane marker from each sensor data item includes receiving, from a camera located on the vehicle, an image includes the lane marker; determining, from the image, pixel locations of corners of the lane marker; receiving, from a light detection and ranging (LiDAR) sensor located on the vehicle, a frame including point cloud data (PCD) of an area of the road that includes the lane marker; and determining a set of three-dimensional (3D) world coordinates of corners of the lane marker.

In some embodiments, the set of 3D world coordinates of the corners of the lane marker are determined by: obtaining, based on a location of the vehicle, a second set of previously stored three-dimension (3D) world coordinates of corners of the lane marker, where the previously stored location information of the lane marker includes the second set of previously stored 3D world coordinates of the corners of lane marker; and projecting the second set of previously stored 3D world coordinates of corners of the lane marker to a coordinate system of the LiDAR sensor to obtain the set of 3D world coordinates of corners of the lane marker in the frame.

At the calculating operation 906, calculating extrinsic parameters of the at least two sensors based on determining a difference between the location information of the lane marker from each sensor data item and a previously stored location information of the lane marker.

In some embodiments, extrinsic parameters of the at least two sensors are calculated by: calculating, for each corner of the lane marker, a first loss function that computes a distance between a pixel location of a corner of a lane marker and the previously stored 3D world coordinates of the corner of the lane marker obtained from the second set; calculating, for each corner of the lane marker, a second loss function that computes a distance between 3D world coordinates of the corner of the lane marker obtained from the set and the previously stored 3D world coordinates of the corner of the lane marker obtained from the second set; and estimating the extrinsic parameters for the camera and LiDAR sensors based on the first loss function and the second loss function, respectively.

In some embodiments, the second set of previously stored 3D world coordinates of corners of the lane marker are projected to the coordinate system of the LiDAR sensor by: obtaining a transformed point cloud by correlating the PCD received from the LiDAR sensor to one or more points of a point cloud map reference; extracting a submap from a previously obtained PCD map; performing a registration of the transformed point cloud to the submap to obtain a first transformation matrix that describes transformation between the transformed point cloud and the submap, where the registration correlates the transformed point cloud to the submap; determining additional transformation matrixes that describes transformation between a position of the LiDAR sensor, the one or more points of the point cloud map reference, and a reference point associated with an inertial measurement unit-global navigation satellite system (IMU-GNSS) sensor located in the vehicle; calculating the set of 3D world coordinates of corners of the lane marker in the frame based on the first transformation matrix, the additional transformation matrixes, and the second set of previously stored 3D world coordinates of the corners of the lane marker.

In some embodiments, the PCD is correlated to the point cloud map reference based on a measurement provided by the IMU-GNSS sensor and a previously stored LiDAR to IMU extrinsic parameters, and the previously stored LiDAR to IMU extrinsic parameters describe a spatial relationship between positions and orientations of the LiDAR and the IMU-GNSS sensor. In some embodiments, the submap includes 3D world coordinates of points within a predetermined distance of the location of the vehicle when the PCD is received.

In some embodiments, the method includes receiving, from a camera located on the vehicle, an image comprising the lane marker; determining, from the image, locations of corners of the lane marker; receiving, from a light detection and ranging (LiDAR) sensor located on the vehicle, a frame comprising point cloud data (PCD) of an area that comprises the lane marker; and determining a set of three-dimensional (3D) world coordinates of the corners of the lane marker, where the at least two sensors comprises the camera and the LiDAR sensor. In some embodiments, the set of 3D world coordinates of the corners of the lane marker are determined by obtaining, based on a location of the vehicle, a second set of previously stored three-dimension (3D) world coordinates of the corners of the lane marker, where the previously stored location information of the lane marker comprises the second set of previously stored 3D world coordinates of the corners of lane marker; and obtaining the set of 3D world coordinates of the corners of the lane marker in the frame by using the second set of previously stored 3D world coordinates of the corners of the lane marker and a coordinate system of the LiDAR sensor.

In some embodiments, the extrinsic parameters of the camera are calculated by calculating, for a corner of the lane marker, a loss function that computes a distance between a location of the corner of a lane marker and the previously stored 3D world coordinates of the corner of the lane marker obtained from the second set; and estimating the extrinsic parameters for the camera based on the loss function. In some embodiments, the extrinsic parameters of the LiDAR sensor are calculated by calculating, for a corner of the lane marker, a loss function that computes a distance between 3D world coordinates of the corner of the lane marker obtained from the set and the previously stored 3D world coordinates of the corner of the lane marker obtained from the second set; and estimating the extrinsic parameters for the LiDAR sensor based on the loss function. In some embodiments, the second set of previously stored 3D world coordinates of the corners of the lane marker are used with the coordinate system of the LiDAR sensor by obtaining a transformed point cloud using the PCD received from the LiDAR sensor with one or more points of a point cloud map reference; performing a registration of the transformed point cloud to a submap to obtain a first transformation matrix that describes transformation between the transformed point cloud and the submap, where the submap is obtained from a previous PCD map; determining additional transformation matrixes that describes transformation between a position of the LiDAR sensor, the one or more points of the point cloud map reference, and a reference point associated with an inertial measurement unit-global navigation satellite system (IMU-GNSS) sensor located in the vehicle; and calculating the set of 3D world coordinates of the corners of the lane marker in the frame based on the first transformation matrix, the additional transformation matrixes, and the second set of previously stored 3D world coordinates of the corners of the lane marker. In some embodiments, the PCD is correlated to the point cloud map reference.

In some embodiments, the obtaining sensor data item from each of the at least two sensors and the extracting the location information of the lane marker from each sensor data item comprises: receiving, from a first sensor located on the vehicle, a first sensor data comprising the lane marker; determining, from the image, locations of corners of the lane marker; receiving, from a second sensor located on the vehicle, a second sensor data of an area of the road that comprises the lane marker; and determining a set of three-dimensional (3D) world coordinates of the corners of the lane marker. In some embodiments, the set of 3D world coordinates of the corners of the lane marker are determined by: obtaining, based on a location of the vehicle, a second set of previously stored three-dimension (3D) world coordinates of the corners of the lane marker, where the previously stored location information of the lane marker comprises the second set of previously stored 3D world coordinates of the corners of lane marker; and projecting the second set of previously stored 3D world coordinates of the corners of the lane marker to a coordinate system of the second sensor to obtain the set of 3D world coordinates of the corners of the lane marker in the second sensor data.

In some embodiments, the extrinsic parameters of the at least two sensors are calculated by: calculating, for each of at least two corners of the lane marker, a first loss function that computes a distance between a location of a corner of a lane marker and the previously stored 3D world coordinates of the corner of the lane marker obtained from the second set; calculating, for each of at least two corners of the lane marker, a second loss function that computes a distance between 3D world coordinates of the corner of the lane marker obtained from the set and the previously stored 3D world coordinates of the corner of the lane marker obtained from the second set; and estimating the extrinsic parameters for the first sensor and the second sensor based on the first loss function and the second loss function, respectively.

In some embodiments, the second set of previously stored 3D world coordinates of the corners of the lane marker are projected to the coordinate system of the second sensor by: obtaining a transformed point cloud by correlating the second sensor data received from the second sensor to one or more points of a point cloud map reference; extracting a submap from a previously obtained map; obtaining, by correlating the transformed point cloud to the submap, a first transformation matrix that describes transformation between the transformed point cloud and the submap; determining additional transformation matrixes that describes transformation between a position of the second sensor, the one or more points of the point cloud map reference, and a reference point associated with an inertial measurement unit-global navigation satellite system (IMU-GNSS) sensor located in the vehicle; and calculating the set of 3D world coordinates of the corners of the lane marker in the second sensor data based on the first transformation matrix, the additional transformation matrixes, and the second set of previously stored 3D world coordinates of the corners of the lane marker. In some embodiments, the submap comprises 3D world coordinates of points within a pre-determined distance of the location of the vehicle when the second sensor data is received.

In some implementations, methods described in the various embodiments are embodied in a computer readable program stored on a non-transitory computer readable media. The computer readable program includes code that when executed by a processor, causes the processor to perform the methods described in some embodiments, including the method described in FIG. 9.

FIG. 10 shows an exemplary block diagram of a computer located in a vehicle to perform multi-sensor calibration techniques described in some embodiments. The computer 1000 includes at least one processor 1010 and a memory 1005 having instructions stored thereupon. The instructions upon execution by the processor 1010 configure the computer 1000 to perform the operations described for cameras, LiDAR sensors, and various modules as described in FIGS. 2 to 9, and/or the operations described in the various embodiments.

In this document the term "exemplary" is used to mean "an example of" and, unless otherwise stated, does not imply an ideal or a preferred embodiment.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this disclosure.

What is claimed is:

1. A method of estimating parameters for vehicle operation, comprising:
   obtaining, from each of at least two sensors located on a vehicle, a sensor data item of a segment of a road comprising a lane marker, wherein point cloud data (PCD) of the segment of the road that comprises the lane marker is obtained from a Light Detection and Ranging (LiDAR) sensor located on the vehicle, wherein the at least two sensors include the LiDAR sensor, and wherein the sensor data item is obtained from each of the at least two sensors as the vehicle is driven on the road;
   determining, from each sensor data item, a location information of the lane marker comprising pixel locations of corners of the lane marker;
   deriving, for each corner of the lane marker, a first distance between a pixel location of a corner of the lane marker and previously stored 3D world coordinates of the corner of the lane marker;
   deriving, for each corner of the lane marker, a second distance between 3D world coordinates of the corner of the lane marker calculated based on a coordinate system of the LiDAR sensor and the previously stored 3D world coordinates of the corner of the lane marker; and
   estimating extrinsic parameters for the at least two sensors based on the first distance and the second distance, respectively.

2. The method of claim 1, wherein the previously stored 3D world coordinates are obtained based on a location of the vehicle.

3. The method of claim 1, wherein the parameters for the vehicle operation are estimated while the vehicle is operated on the road.

4. The method of claim 1, wherein the 3D world coordinates of the corner of the lane marker are calculated based on a coordinate system of the LiDAR sensor by:
   obtaining a transformed point cloud by correlating the PCD received from the LiDAR sensor to one or more points of a point cloud map reference;
   extracting a submap from a previously obtained PCD map;
   correlating the transformed point cloud to the submap to obtain a first transformation matrix that describes transformation between the transformed point cloud and the submap;
   determining additional transformation matrices that describe transformation between a position of the LiDAR sensor, the one or more points of the point cloud map reference, and a reference point associated with an inertial measurement unit-global navigation satellite system (IMU-GNSS) sensor located in the vehicle; and
   calculating 3D world coordinates of the corners of the lane marker in a frame based on the first transformation matrix, the additional transformation matrices, and the previously stored 3D world coordinates of the corners of the lane marker.

5. The method of claim 4, wherein:
   the LiDAR sensor and the IMU-GNSS sensor are located at different positions at the vehicle and/or have different orientations.

6. The method of claim 4,
   wherein the PCD is correlated to the point cloud map reference based on a measurement provided by the IMU-GNSS sensor and previously stored extrinsic parameters associated with the LiDAR and IMU, and
   wherein the previously stored extrinsic parameters associated with the LiDAR and IMU describe a spatial relationship between positions and orientations of the LiDAR sensor and the IMU-GNSS sensor.

7. The method of claim 4, wherein the submap comprises 3D world coordinates of points within a pre-determined distance of the location of the vehicle when the PCD is received.

8. A non-transitory computer readable storage medium having code stored thereon, the code, when executed by a processor, causing the processor to implement a method of estimating parameters for vehicle operation, the method comprising:
   obtaining, from each of at least two sensors located on a vehicle, a sensor data item of a segment of a road comprising a lane marker, wherein point cloud data (PCD) of the segment of the road that comprises the lane marker is obtained from a Light Detection and Ranging (LiDAR) sensor located on the vehicle, wherein the at least two sensors include the LiDAR sensor, and wherein the sensor data item is obtained from each of the at least two sensors as the vehicle is driven on the road;
   determining, from each sensor data item, a location information of the lane marker comprising pixel locations of corners of the lane marker;
   deriving, for each corner of the lane marker, a first distance between a pixel location of a corner of the lane marker and previously stored 3D world coordinates of the corner of the lane marker;
   deriving, for each corner of the lane marker, a second distance between 3D world coordinates of the corner of the lane marker calculated based on a coordinate system of the LiDAR sensor and the previously stored 3D world coordinates of the corner of the lane marker; and estimating extrinsic parameters for the at least two sensors based on the first distance and the second distance, respectively.

9. The non-transitory computer readable storage medium of claim 8, wherein the previously stored 3D world coordinates are obtained based on a location of the vehicle.

10. The non-transitory computer readable storage medium of claim 8, wherein the parameters for the vehicle operation are estimated while the vehicle is operated on the road.

11. The non-transitory computer readable storage medium of claim 8, wherein the 3D world coordinates of the corner of the lane marker are calculated based on a coordinate system of the LiDAR sensor by:
   obtaining a transformed point cloud by correlating the PCD received from the LiDAR sensor to one or more points of a point cloud map reference;
   extracting a submap from a previously obtained PCD map;
   correlating the transformed point cloud to the submap to obtain a first transformation matrix that describes transformation between the transformed point cloud and the submap;
   determining additional transformation matrices that describe transformation between a position of the LiDAR sensor, the one or more points of the point cloud map reference, and a reference point associated with an inertial measurement unit-global navigation satellite system (IMU-GNSS) sensor located in the vehicle; and
   calculating 3D world coordinates of the corners of the lane marker in a frame based on the first transformation matrix, the additional transformation matrices, and the previously stored 3D world coordinates of the corners of the lane marker.

12. The non-transitory computer readable storage medium of claim 11, wherein:
   the LiDAR sensor and the IMU-GNSS sensor are located at different positions at the vehicle and/or have different orientations.

13. The non-transitory computer readable storage medium of claim 11,
   wherein the PCD is correlated to the point cloud map reference based on a measurement provided by the IMU-GNSS sensor and previously stored extrinsic parameters associated with the LiDAR and IMU, and
   wherein the previously stored extrinsic parameters associated with the LiDAR and IMU describe a spatial relationship between positions and orientations of the LiDAR sensor and the IMU-GNSS sensor.

14. The non-transitory computer readable storage medium of claim 11, wherein the submap comprises 3D world coordinates of points within a pre-determined distance of the location of the vehicle when the PCD is received.

15. A system for estimating parameters for vehicle operation, the system comprising a processor configured to:
   obtain, from each of at least two sensors located on a vehicle, a sensor data item of a segment of a road comprising a lane marker, wherein point cloud data (PCD) of the segment of the road that comprises the lane marker is obtained from a Light Detection and Ranging (LiDAR) sensor located on the vehicle, wherein the at least two sensors include the LiDAR sensor, and wherein the sensor data item is obtained from each of the at least two sensors as the vehicle is driven on the road;
   determine, from each sensor data item, a location information of the lane marker comprising pixel locations of corners of the lane marker;
   derive, for each corner of the lane marker, a first distance between a pixel location of a corner of the lane marker and previously stored 3D world coordinates of the corner of the lane marker;
   derive, for each corner of the lane marker, a second distance between 3D world coordinates of the corner of the lane marker calculated based on a coordinate system of the LiDAR sensor and the previously stored 3D world coordinates of the corner of the lane marker; and
   estimate extrinsic parameters for the at least two sensors based on the first distance and the second distance, respectively.

16. The system of claim 15, wherein the previously stored 3D world coordinates are obtained based on a location of the vehicle.

17. The system of claim 15, wherein the parameters for the vehicle operation are estimated while the vehicle is operated on the road.

18. The system of claim 15, wherein the 3D world coordinates of the corner of the lane marker are calculated based on a coordinate system of the LiDAR sensor by the processor configured to:
   obtain a transformed point cloud by correlating the PCD received from the LiDAR sensor to one or more points of a point cloud map reference;
   extract a submap from a previously obtained PCD map;
   correlate the transformed point cloud to the submap to obtain a first transformation matrix that describes transformation between the transformed point cloud and the submap;
   determine additional transformation matrices that describe transformation between a position of the LiDAR sensor, the one or more points of the point cloud map reference, and a reference point associated with an inertial measurement unit-global navigation satellite system (IMU-GNSS) sensor located in the vehicle; and
   calculate 3D world coordinates of the corners of the lane marker in a frame based on the first transformation matrix, the additional transformation matrixes matrices, and the previously stored 3D world coordinates of the corners of the lane marker.

19. The system of claim 18, wherein:
   the LiDAR sensor and the IMU-GNSS sensor are located at different positions at the vehicle and/or have different orientations.

20. The system of claim 18,
   wherein the PCD is correlated to the point cloud map reference based on a measurement provided by the IMU-GNSS sensor and previously stored extrinsic parameters associated with the LiDAR and IMU, and
   wherein the previously stored extrinsic parameters associated with the LiDAR and IMU describe a spatial relationship between positions and orientations of the LiDAR sensor and the IMU-GNSS sensor.

* * * * *